Aug. 6, 1935. E. A. WINFIELD 2,010,170
INTERNAL COMBUSTION ENGINE
Filed Oct. 31, 1932

Inventor
Edward A. Winfield.

Attorney.

Patented Aug. 6, 1935

2,010,170

UNITED STATES PATENT OFFICE 2,010,170

INTERNAL COMBUSTION ENGINE

Edward A. Winfield, La Canada, Calif.

Application October 31, 1932, Serial No. 640,447

8 Claims. (Cl. 123—74)

This invention relates in general to internal combustion engines, particularly of the two-cycle type, in which the fuel intake to the cylinder and exhaust of combustion gases therefrom, occurs through ports in the sides of the cylinder, the fuel charge being directed within the cylinder in a manner such as to prevent its escape through the exhaust ports and to scavenge the cylinder of the burned gases.

In the present type of engine the exhaust and intake ports are placed in circular arrangement in the walls of the cylinder, the two sets of ports being spaced axially of the cylinder and adapted to be successively uncovered by the piston during its firing stroke to preliminarily exhaust the burned gases and to admit fresh charge to the cylinder. Upon uncovering of the exhaust ports, the greater part of the combustion gases is discharged due to the pressure within the cylinder, the initial point of exhaust thus occurring before the piston reaches the limit of its firing stroke. Immediately after the uncovering of the exhaust ports and resulting reduction of pressure in the cylinder, the piston uncovers the intake ports to admit a fresh fuel charge. At this point, the fuel charge is directed radially inward to the center of the cylinder and is caused to flow upward therein in a central core and at high velocity, the charge upon reaching the upper end of the cylinder spreading outward and then reversing its direction of flow by passing downward around its initial upward path, to clear the remaining combustion gases from the cylinder through the exhaust ports.

In order that the fuel charge may be directed within the cylinder in the manner stated, and to insure that it will follow the desired path and will flow with the necessary velocity to maintain that path, the fuel charge is highly compressed prior to its injection into the cylinder. As a typical and preferred means for so subjecting the fuel charge to compression prior to its injection into the cylinder, a compression chamber is provided in the lower interior of the cylinder. This compression chamber is communicable with the combustion chamber by way of the intake ports, a suitable arrangement of fuel supply ports being provided for admitting fuel to the combustion chamber. This compression chamber and associated ports and passages are designed so as to have the smallest possible volume or cubic content, in order that sufficient velocity may be maintained at the intake ports during idling speeds when the amount of fuel mixture handled is small. The piston, during its down stroke, compresses the fuel charge in the compression chamber, and later, toward the end of its down stroke, permits delivery of the compressed charge to the combustion chamber by uncovering the intake ports. The piston thus serves the combined functions of compressing the charge in the combustion chamber in the usual manner, controlling the fuel intake and exhaust of combustion gases, and compressing the subsequent fuel charge prior to its injection into the combustion chamber.

Engines having the characteristics mentioned hereinabove, comprise the subject matter of my copending application Ser. No. 379,781, filed July 20, 1929, now Patent No. 1,968,473, July 31, 1934, on Internal combustion engines. The present invention relates to improvements in this general type of engine, and pertains particularly to the provision in the cylinder of means for directing the injected fuel charge in such paths as to accomplish proper scavenging of combustion gases from the cylinder, but preventing escape of the injected fuel through the exhaust ports toward the end of the scavenging operation. In the engine described in my copending application referred to, the fuel is injected in an upward stream as a central fluid core within the cylinder, and is caused to spread outwardly at the upper end of the cylinder and to pass downwardly around its initial upward path, the down-flowing fuel stream being permitted to follow the wall of the cylinder and to approach the exhaust ports at the lower end of the cylinder. It has been found that under conditions producing high volumetric efficiency, part of the fuel charge escapes through the exhaust ports. It is to overcome this objectionable tendency that the invention has its primary object.

As previously stated, the invention contemplates the provision of charge deflecting walls or surfaces at the upper or head end of the cylinder, so arranged as to direct the down-flowing fuel stream away from a path following the wall of the cylinder, thereby obviating any tendency for the fuel to escape through the exhaust ports before the latter becomes covered at the beginning of the piston up-stroke. Preferably the charge deflecting wall at the head of the cylinder is so made as to direct the down-flowing fuel stream inwardly toward the central core of the up-flowing fuel, to the end that as the charge passes downwardly around this core, there will be a tendency for the fuel to become picked up in the up-flowing stream and thus become carried away from the exhaust ports.

The invention will be understood to best advantage without further preliminary discussion, from the following detailed description of certain typical and preferred forms of the invention. Reference is had for purposes of description to the accompanying drawing in which.

For the purpose of facilitating illustration and description of the invention, I have shown the latter to be embodied in a single cylinder engine. It will be understood however, that by so describing the invention in connection with a single cylinder engine, I do not impliedly limit the invention to this particular type of engine, for as will readily appear, the invention is wholly independent of the number of cylinders which the engine may have.

Figure 2:
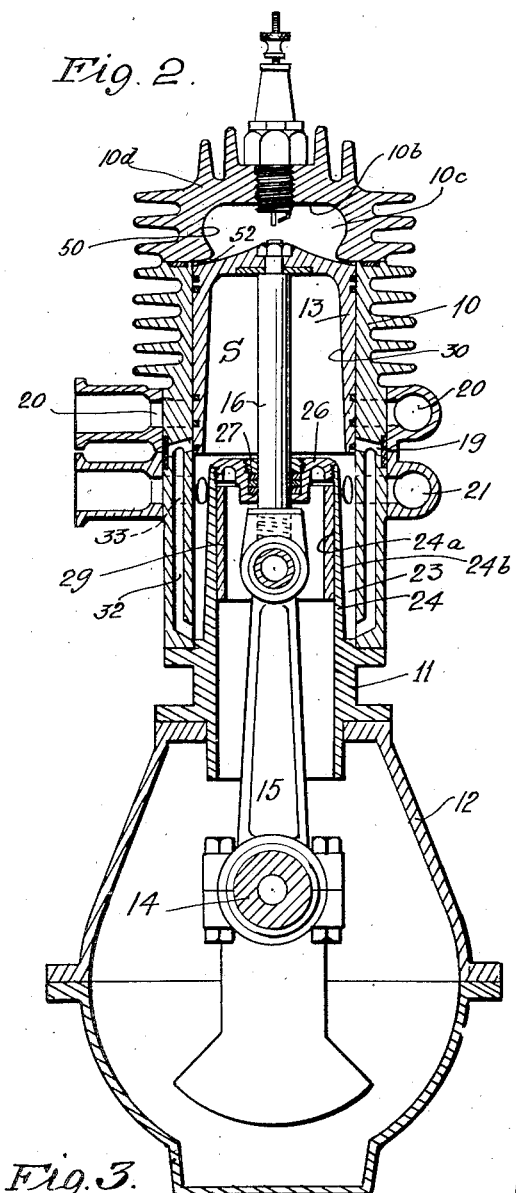
Fig. 2 is similar to Fig. 1, the piston being shown at the limit of its compression stroke.
Figure 1:
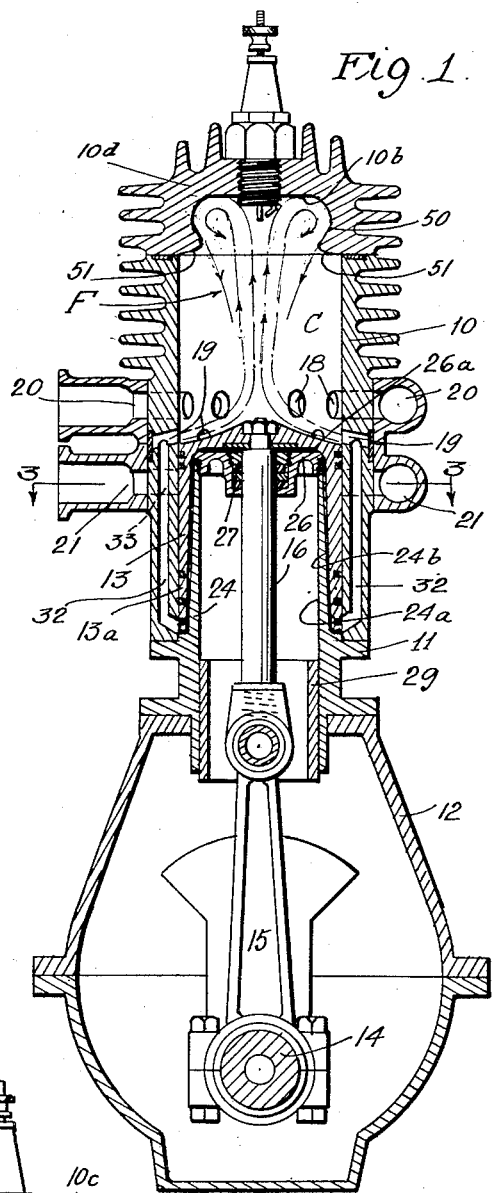
Fig. 1 is a vertical medial section through a single cylinder engine embodying the invention, the piston being shown at the end of its firing stroke.
Figure 3:
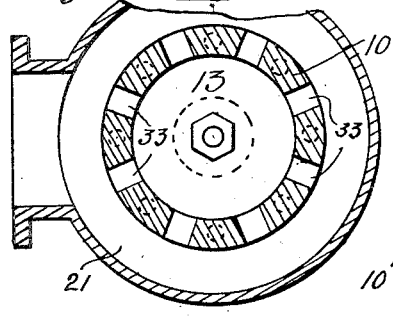
Fig. 3 is a section on line 3—3 of Fig. 1, the piston being shown in plan.

Referring first to Figs. 1 and 2 of the drawing, the cylinder 10 is shown typically to be mounted on a flanged member 11 above the crank case 12, the piston 13 in the cylinder being connected with the crank shaft 14 in the usual manner by means of connecting rod 15 and piston rod 16. A plurality of radial and circumferentially spaced exhaust ports 18 are provided in the cylinder wall at a predetermined vertical point therein, these ports being adapted to be uncovered by the piston toward the end of its firing stroke, as indicated in Fig. 1. At a predetermined distance below the exhaust ports is a plurality of circumferentially spaced fuel intake ports 19, which are uncovered by the piston at the end of its stroke to permit the fuel charge to be directed radially inward toward the axial center of the combustion chamber C. The intake ports may be inclined as illustrated in order to facilitate the flow of the fuel charge upward within the combustion chamber, although this is not fundamental to the proper directing of the charge, since the latter upon being injected to the radial center of the chamber at high velocity, will necessarily rise and follow a central path within the chamber. The exhaust ports 18 open outwardly into the annular exhaust manifold 20 which extends around the cylinder.

Within the cylinder and annularly spaced at 23 upon the inner wall thereof, is a tubular element or supporting liner 24 which, preferably, is formed integrally with the flanged member 11. The inner surface 24a of the liner is truly cylindrical, but its outer surface 24b at the inside of space 23, is given a gradual upward taper as shown. The upper end of the tubular liner is closed by means of bushing 26, the latter carrying a central packing gland 27 within which the piston rod 16 works. It will be noted that the bushing serves essentially as a lower end wall for the fuel compression chamber S within the piston, hereinafter described, the vertical position of the bushing supporting member 24 preferably being regulated so as to provide a slight clearance as at 26a between the bushing and the piston when the latter is in its lowermost position, although this clearance may be varied if desired. The wrist pin interconnecting the piston rod and the connecting rod 15 terminates in the reciprocating sleeve 29 within the tubular liner 24, the latter serving as a guide for the sleeve. The liner thus serves the combined functions of supporting, from beneath, the bushing 26 to form the lower end wall of the compression chamber, of providing a guide for the reciprocating sleeve 29, and also for defining, with the cylinder wall, the annular space 23 within which the lower skirt portion 13a of the piston reciprocates.

The piston 13 is shaped in the form of an inverted cup, the depending skirt portion 13a of the piston being adapted to work within the annular space 23 between the cylinder and the liner 24. The inner surface of the piston preferably is tapered in conformity with the outer surface 24b of the liner, the purpose of so tapering these surfaces 24b and 30 being to allow immediate escape of compressed gases from the compression chamber within the piston and above the upper end of the liner, upon the uncovering of the fuel discharge ports by the piston. That is to say, by tapering the inner and outer surfaces of the piston and liner respectively, a greater amount of clearance is provided between these surfaces for the escape of the compressed charge, without sacrificing in any way the ultimate compression obtained, than would be the case were surfaces 24b and 30 both cylindrical and a clearance space of uniform area provided therebetween.

The annular space 23 communicates with an intake manifold 21, similar to the described exhaust manifold, by way of the radial ports 33 extending through the cylinder walls, fuel being drawn from the intake manifold during the compression or upward stroke of the piston into space 23 and the interior chamber S within the piston. Thus it will be noted that during the firing stroke of the piston and after the latter moves downward sufficiently far to cover ports 33, the chamber S and the annular space 24 form a compression chamber for the fuel prior to its delivery to the combustion chamber C. At the point of uncovering the intake ports 19 by the piston substantially at the end of its firing stroke, delivery of the compressed fuel charge within the fuel compression chamber occurs through a plurality of passages 32 formed longitudinally in the cylinder wall and opening at their upper ends into the intake ports.

In describing the operation of the engine, it may be assumed first that the piston is in the position shown in Fig. 2 and starting on its firing stroke. The fuel charge previously drawn into chamber S and the annular space 23, during the compression stroke of the piston, is subjected to compression by the piston during its firing stroke after communication with the intake manifold is cut off by the piston covering the intake ports 33. Compression of the fuel charge continues until the piston reaches substantially the limit of its firing stroke, at which point the intake ports 19 are uncovered and the compressed charge beneath the piston is discharged into the combustion chamber C by way of passages 32 and the intake ports. It will be understood that the degree to which the fuel charge is compressed may be controlled in numerous ways, for instance by regulating the clearance between the liner 24 and the lower or inner surface of the piston, or by predetermining the vertical positions of the intake ports 33, thereby fixing the point of cut-off by the piston.

At the point of uncovering the exhaust ports 18 by the piston during its firing stroke, the greater part of the burned gases in chamber C will, by virtue of the pressure therein, be discharged into the exhaust manifold. As previously mentioned, the arrangement of the ports and the path of flow of the fuel charge within the chamber is such that the fuel charge itself serves to complete the scavenging or removal of the remaining exhaust gases. Thus upon uncovering of the intake ports 19, the fuel charge is directed radially inward to the center of the chamber, the charge thence flowing at high velocity upwardly and centrally in the form of frustrum of an inverted cone, as indicated at F in Fig. 1.

The charge, upon impinging against surface 10b in the cored interior 10c of the cylinder head 10d, is caused to spread outward and to reverse its path, and then to flow downward at reduced velocity toward the lower end of the cylinder, the downward flowing fuel acting to clean the chamber of combustion gases by expelling them through the exhaust ports. Thus the fuel charge serves to displace a portion of the gases of combustion in its upward travel through the center of the chamber, and to complete the removal of the gases in sweeping downward about its previously traversed path. By virtue of the charge being directed at high velocity against the cylinder head, there is assured a properly atomized fuel mixture at the point of ignition 31 at the plug. The arrows in Fig. 1 indicate the path of flow followed by the injected fuel charge within the cylinder.

Upon being injected at high velocity through the intake ports 19 in radial paths through the center of the combustion chamber, the charge then flows in a path resembling an upwardly spreading core until the fuel is impinged against surface 10b of the head. Then, as indicated by the arrows, the fuel spreads outward and reverses its initial flow around the central core. As will appear, in the event the side walls of the cored interior of the cylinder head were formed merely as a cylindric continuation of the interior of the cylinder 10, and this is the usual construction, there would be a tendency for the downwardly directed fuel stream to follow the wall of the cylinder and to pass directly to the exhaust ports. In this event part of the fuel charge escapes through the exhaust ports before the latter become covered by the piston.

In accordance with the invention, such escape of fuel through the exhaust ports is overcome by so forming the side walls of the cavitated interior (the ignition chamber) 10c of the head, that the down flowing charge will be directed inwardly within the cylinder toward the central up flowing stream. In Figs. 1 and 2, the sides of the compression space 10c in the head are formed by annular surface 50 which is given a suitable downward and inward slope, the lower portion of this inclined surface preferably projecting inwardly beyond the wall of the cylinder. The slope of surface 50 may be as desired, but preferably it will be such that it will cause the fuel to be deflected inwardly from the wall of the cylinder a distance sufficient to prevent its escape through the exhaust ports, and yet cause the down-flowing stream to occupy a sufficient portion of the interior of the cylinder as to accomplish proper scavenging of combustion gases. As indicated by the arrows in Fig. 1, the fuel charge is deflected inwardly by the annular surface 50 in an outside cone-shaped path so that the down-flowing particles tend to become picked up by the central up-flowing stream and to thus become carried away from the exhaust ports. A further advantageous result is attained by so directing the fuel charge within the cylinder, in that a turbulent and eddying condition of the fuel stream is maintained, which promotes a thorough mixing of the fuel and air and atomization of the fuel particles.

Annular surface 51, projecting inwardly from the cylinder wall at the lower end of the head, preferably is shaped in conformity with the outside top surface of the piston, and when the piston is at the limit of its compression stroke, see Fig. 2, there is allowed a suitable small clearance at 52 between surface 51 and the upper end of the piston. The effect of this is to reduce detonation, or premature burning of the fuel charge, between the surface 51 and the piston itself. It will be unnecessary to enter into a detailed discussion of the theory of detonation, and the effect had upon the burning of the charge by carrying away a portion of the heat of compression by way of the heat conducting surface 51 of the head, and by way of the piston itself, since this will be readily understood by those familiar with the art.

While the invention contemplates the shaping of the top surface 10b of the head in any suitable manner, as by making in convex or concave, in accordance with the deflecting action on the upward flowing fuel stream desired, I have shown surface 10b, in Figs. 1 and 2, to be substantially flat.

Figure 4:
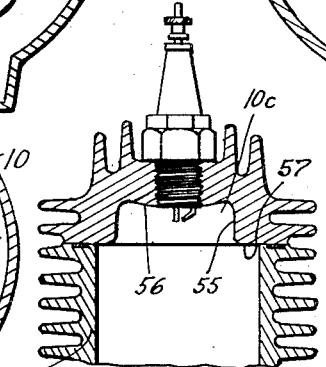
Fig. 4 is a fragmentary view of a cylinder and cylinder head illustrating a variational form of the invention.

In Fig. 4, I show a variational form of the invention in which the side walls 55 of the cavitated interior 10c of the head extend vertically, instead of sloping inwardly at an angle as in the previously described form. Also in Fig. 4 I show the upper wall 56 of the head cavity to be given a slightly convex shape for the purpose of effecting a more pronounced spreading of the fuel upon striking this surface. Instead of being positively deflected inwardly within the cylinder as in the previous instance, here the fuel charge is directed by the vertical annular surface 55 in a comparatively straight downward path, as indicated by the arrows. However, since the internal diameter of the annular wall 55 is substantially less than that of the cylinder, the down-flowing fuel stream is prevented from following the wall of the cylinder, and instead is kept a sufficient distance inwardly from the cylinder wall, that the charge tends to be picked up by the upward flowing stream. The effect and advantage of the inwardly projecting annular surface 57 at the lower end of the head, is of course the same as that previously described with reference to Figs. 1 and 2.

By virtue of there being a plurality of exhaust ports adapted to be simultaneously uncovered by the piston, provision is made for a large exhaust area with a comparatively short length of piston travel, and as a result an immediate preliminary discharge of the combustion gases is effected prior to the uncovering of the intake ports. In order to insure thorough scavenging of the cylinder by the fuel charge, the exhaust ports necessarily remain open a sufficient length of time for the charge to complete its flow through the path described. The time interval however, during which the exhaust ports remain open may be controlled by predetermining the size of the exhaust ports. It will be apparent that excessive heating of the piston is prevented due to the charge first being conducted beneath the piston and thereafter caused to sweep across its upper end during the period of intake of the combustion chamber.

I claim:

1. In an internal combustion engine, a cylinder and a piston in said cylinder, inlet ports and exhaust ports in the wall of said cylinder and adapted to be intermittently covered and uncovered by the piston, a gaseous charge being directed from said inlet ports radially into said cylinder and in a stream flowing centrally within the cylinder to its upper end, the charge then reversing its flow and passing downward about its upward path, a downwardly and radially inwardly inclined charge deflecting wall at the upper end of the cylinder arranged to direct the down-flowing fuel charge radially toward the upward flowing stream and away from the wall of the cylinder, and a shoulder formed by the lower end of said wall and projecting inwardly from the cylinder wall to overlie the piston.

2. In an internal combustion engine, a cylinder and a piston in said cylinder, inlet ports and exhaust ports in the wall of said cylinder and adapted to be intermittently covered and uncovered by the piston, a gaseous charge being directed from said inlet ports radially into said cylinder and in a stream flowing centrally within the cylinder to its upper end, the charge then reversing its flow and passing downward about its upward path, a cavitated head at the upper end of said cylinder having a downwardly extending annular charge deflecting surface acting to direct the down-flowing fuel charge away from the wall of the cylinder, said surface having a downward and inward curvature and extending inwardly a substantial distance beyond the cylinder wall, and an annular shoulder extending transversely from the lower edge of said surface to the bore wall and overlying the outermost top annular area of the piston.

3. In an internal combustion engine having a cylinder bore, an ignition chamber in communication with one end of the cylinder bore, and a piston which moves toward said chamber on its compression stroke, means for directing within said bore a high velocity fuel charge stream from a point longitudinally spaced from the ignition chamber toward the chamber, there being an exhaust port from the cylinder bore and longitudinally spaced from said chamber, a wall in said chamber positioned to reverse the flow of the charge, and a directing surface in the ignition chamber and below said wall, said surface extending toward and having its lowermost edge adjacent the upper end of the cylinder bore, said edge being spaced radially inward from the adjacent bore-defining wall and lying in the radial plane of the exhaust port, and the surface immediately above said edge being spaced from the longitudinal axis of the cylinder bore a distance at least as great as is the distance between said edge and said axis, all in a manner whereby the reversely flowing fluid is directed in a path radially spaced from the cylinder wall beneath the surface and hence from said exhaust port, and a shoulder extending from said edge to the wall of said bore and forming with the piston at the end of its compression stroke, a narrow compression space.

4. In an internal combustion engine having a cylinder bore, an ignition chamber in communication with one end of the cylinder bore, and a piston which moves toward said chamber on its compression stroke, means for directing centrally within said bore a high velocity fuel charge stream from a point longitudinally spaced from the ignition chamber toward the chamber, there being a plurality of circumferentially spaced exhaust ports opening from said cylinder bore, said ports being spaced longitudinally from said chamber, a wall in said chamber positioned to reverse the flow of the charge, and an annular directing surface in the ignition chamber and below said wall, said surface extending toward and having its lowermost edge adjacent the upper end of the cylinder bore, said edge being spaced radially inward from the adjacent bore-defining wall, and the surface immediately above said edge being spaced from the longitudinal axis of the cylinder bore a distance at least as great as is the distance between said edge and said axis, all in a manner whereby the reversely flowing fluid is directed in a path radially spaced from the cylinder wall and hence from said exhaust ports, and an annular shoulder extending from said edge transversely to the wall of said bore and forming with the piston at the end of its compression stroke, an annular compression space.

5. In an internal combustion engine having a cylinder bore, an ignition chamber in communication with one end of the cylinder bore, and a piston which moves toward said chamber on its compression stroke, means for directing centrally within said bore a high velocity fuel charge stream from a point longitudinally spaced from the ignition chamber toward the chamber, there being a plurality of circumferentially spaced exhaust ports opening from said cylinder bore, said ports being spaced longitudinally from said chamber, a wall in said chamber positioned to reverse the flow of the charge, and an annular directing surface in the ignition chamber and below said wall, said surface extending toward and having its lowermost edge adjacent the upper end of the cylinder bore, said edge being spaced radially inward from the adjacent bore-defining wall, the diameter of the opening defined by said annular edge being at least as extensive as the radius of the cylinder bore, and the surface immediately above said edge being spaced from the longitudinal axis of the cylinder bore a distance at least as great as is the distance between said edge and said axis, all in a manner whereby the reversely flowing fluid is directed in a path radially spaced from the cylinder wall and hence from said exhaust ports.

6. In an internal combustion engine having a cylinder bore, an ignition chamber in communication with one end of the cylinder bore, and a piston which moves toward said chamber on its compression stroke, means for directing within said bore a high velocity fuel charge stream from a point longitudinally spaced from the ignition chamber toward the chamber, a wall in said chamber positioned to reverse the flow of the charge, and a directing surface in the ignition chamber and below said wall, said surface being a continuation of said wall and having a lower edge offset inwardly with respect to the bore wall, and a shoulder extending transversely and continuously from said edge to the bore wall and forming with the piston at the end of its compression stroke, a narrow compression space.

7. In an internal combustion engine having a cylinder and a piston in said cylinder, means for directing a high velocity gaseous stream centrally and longitudinally within said cylinder to its upper end, the charge then reversing its flow and passing downwardly about its upper path, and a cavitated head applied to the upper end of said cylinder and including a downwardly extending charge deflecting surface having its lower edge offset inwardly from the cylinder wall, the lower end of the head forming a shoulder extending continuously from said edge to the cylinder wall and overlying the piston, and said shoulder forming with the piston at the end of its compression stroke, a narrow compression space.

8. In an internal combustion engine having a cylinder and a piston in said cylinder, means for directing a high velocity gaseous stream centrally and longitudinally within said cylinder to its upper end, the charge then reversing its flow and passing downwardly about its upper path, and a cavitated head applied to the upper end of said cylinder and including a downwardly and inwardly extending annular charge deflecting surface having its lower edge offset inwardly from the cylinder wall, the lower end of the head forming an annular shoulder extending continuously from said edge to the cylinder wall and overlying the piston, and said shoulder forming with the piston at the end of its compression stroke, a narrow compression space.

EDWARD A. WINFIELD.